United States Patent [19]

Hartmann et al.

[11] Patent Number: 4,849,818
[45] Date of Patent: Jul. 18, 1989

[54] TELEVISION RECEIVER WITH RECEIVING DEVICES FOR PROCESSING VIDEOTEXT AND TELETEXT SIGNALS

[75] Inventors: Uwe Hartmann, Villingen-Schwenningen; Udo Mai, Tannheim; Fritz Ohnemus, Villingen-Schwenningen, all of Fed. Rep. of Germany

[73] Assignee: Deutsche Thomson-Brandt GmbH, Villingen, Fed. Rep. of Germany

[21] Appl. No.: 240,433

[22] Filed: Sep. 1, 1988

Related U.S. Application Data

[63] Continuation of Ser. No. 7,906, Jan. 13, 1987, abandoned.

[30] Foreign Application Priority Data

May 17, 1985 [DE] Fed. Rep. of Germany ....... 3517698

[51] Int. Cl.⁴ ...................... H04N 7/08; H04N 7/087; H04N 3/24
[52] U.S. Cl. .................................. 358/142; 358/147; 358/165
[58] Field of Search ............... 358/142, 143, 144, 145, 358/146, 147, 165, 181, 183

[56] References Cited

U.S. PATENT DOCUMENTS

| | | | |
|---|---|---|---|
| 3,549,795 | 12/1970 | Mullin | 358/165 |
| 4,435,729 | 3/1984 | Harwood et al. | 358/183 |
| 4,633,297 | 12/1986 | Skerlos et al. | 358/147 |
| 4,677,488 | 6/1987 | Zato | 358/147 |

FOREIGN PATENT DOCUMENTS

| | | | |
|---|---|---|---|
| 0235592 | 11/1985 | Japan | 358/165 |
| 1556366 | 11/1979 | United Kingdom | 358/147 |

Primary Examiner—Edward L. Coles, Sr.
Assistant Examiner—Michael D. Parker
Attorney, Agent, or Firm—Max Fogiel

[57] ABSTRACT

A television set with videotext and/or teletext decoders having character generators which are synchronized by the deflection generators of the television set and in which audio will be forwarded only when an authorized television signal is being received and in that a memory in the decoder will be accessible to display a recognizable image even when the television transmitter is turned off.

2 Claims, 2 Drawing Sheets

TELEVISION RECEIVER WITH RECEIVING DEVICES FOR PROCESSING VIDEOTEXT AND TELETEXT SIGNALS

This is a continuation of U.S. Ser. No. 07/007,906 filed 01/13/87 now abandoned.

The point of departure for the invention is a television receiver with receiving devices for processing videotext and/or teletext signals and with deflection generators for line-synchronized and frame-synchronized scanning of the character generators in the receiving devices.

To maintain a recognizable image on the screen of a television receiver of this type the deflection generators in the receiver must be synchronized with the character generators. Providing the character generators of the videotext or teletext decoder with synchronization generators that generate synchronization signals matching the television synchronization signals in order to synchronize the deflection generators in the receiving device is known. A drawback to the known circuitry is that certain models of the television receiver do not comply with federal communications regulations, meaning that noise from outside broadcasting sources like the police radio must be muted. Circuitry that passes the audio on through a gate circuit when an authorized television signal is being received and suppresses it otherwise is accordingly provided.

In what is called mixed operation—when, that is, videotext or teletext is being received and a television picture is being played back as background—the television transmitter is sometimes turned off while the receiver is still adjusted for mixed operation. Although the television picture will then disappear, the background will exhibit noise while the videotext or teletext continues to be displayed in the foreground. The synchronization generators built into the videotext or teletext decoder will now assume synchronization of the television receiver. Since the muting circuit cannot distinguish between television signal-synchronization pulses and the synchronization pulses deriving from the decoder, the audio channel will remain switched through. If the television receiver is then tuned to an outside broadcasting station, not the television transmitter that is, it will be possible to hear its modulation, which is impermissible. The problem can be solved with an additional muting circuit, including a pulse-separation stage and a coincidence stage, which, however, increases the cost of the circuitry.

The object of the invention is to ensure that the audio will be forwarded only when an authorized television signal is being received and in that the memory in the videotext decoder or teletext decoder will be accessible and a recognizable image will be displayed during the aforesaid operating conditions even when the television transmitter is turned off.

This object is attained in accordance with the measure recited in the claim. The advantage of the invention is that the synchronization generators in the character generators can be blocked, whereby the effect of the muting circuitry will be completely maintained, complying with regulations during this type of operation as well. The complicated synchronization-signal switching can also be eliminated.

The invention will now be specified with reference to the drawings, wherein

FIG. 2 illustrates the system being applied for.

Figure 2:
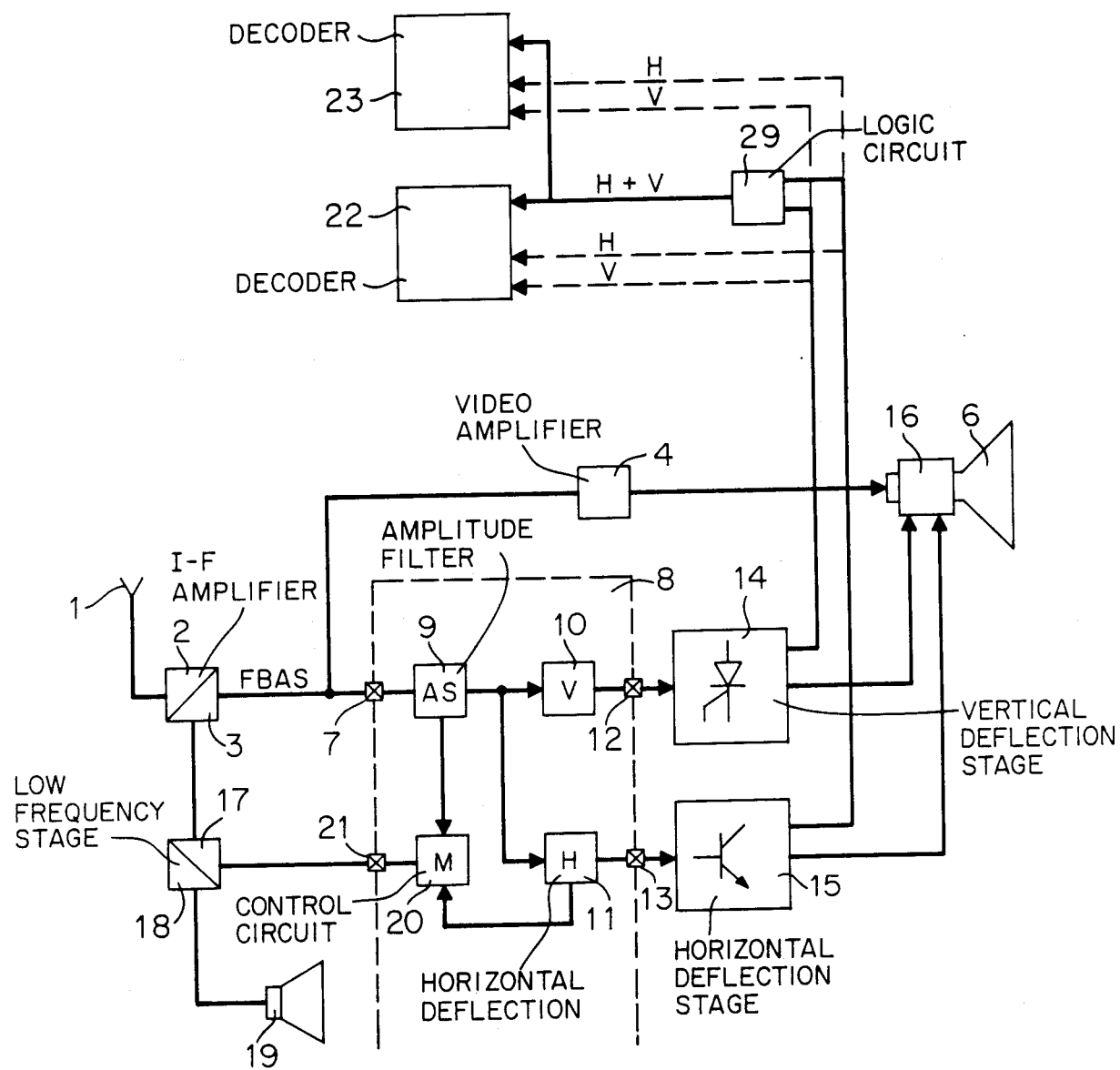

The state-of-the-art circuitry will be described and illustrated first in order subsequently to emphasize the essential differences between it and the invention with reference to FIG. 2.

Figure 1:
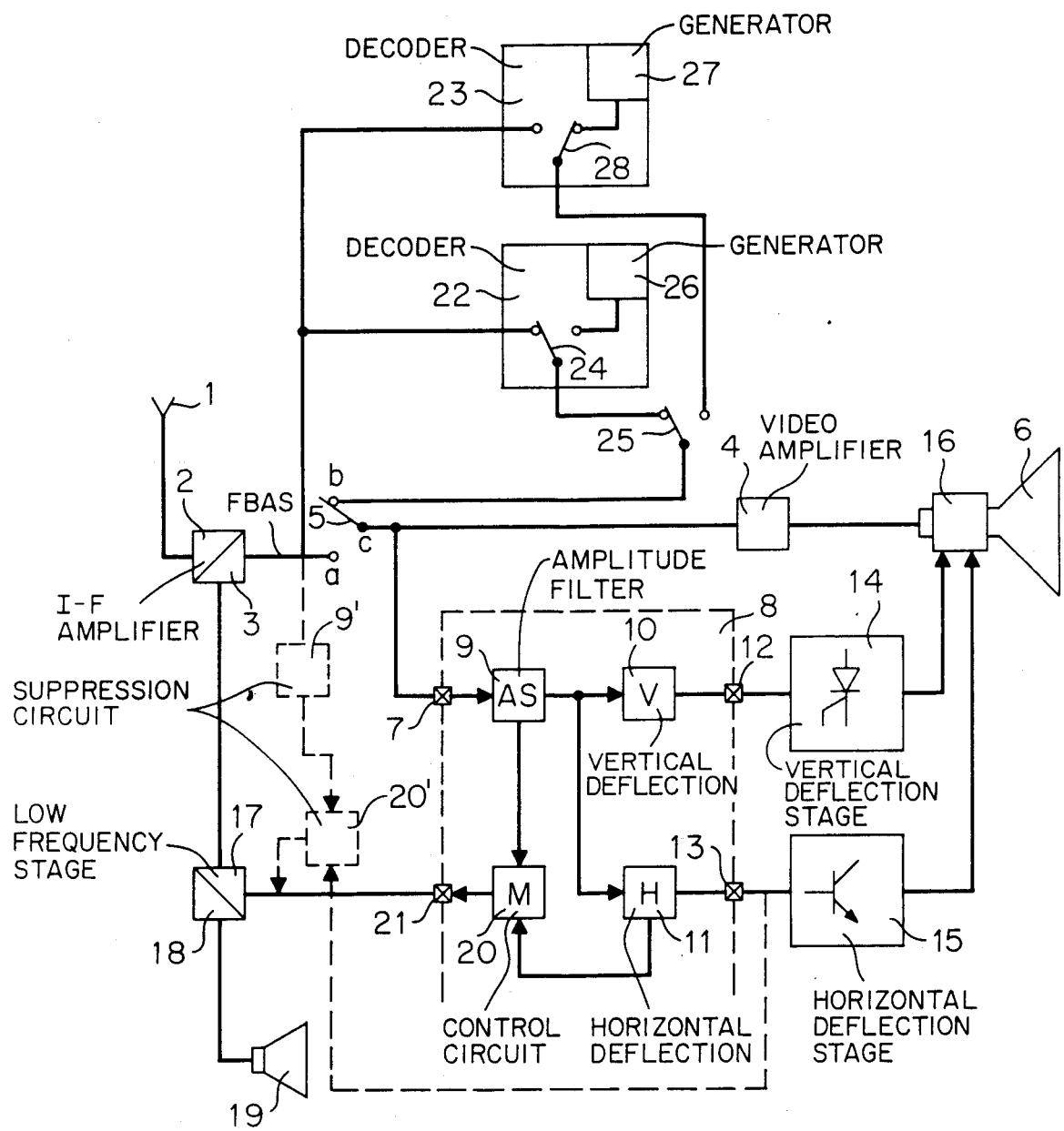
FIG. 1 illustrates the state of the art.

A television signal arrives at a tuner 2 through an antenna 1. A composite color signal is derived from an intermediate-frequency amplifier 3 and supplied to a video amplifier 4 through the change-over contact a-c of a change-over switch 5. A picture tube 6 is connected to video amplifier 4. The composite color signal is also supplied to the input terminal 7 of an integrated circuit 8 and arrives at an amplitude filter 9 that separates the horizontal synchronization pulses from the vertical. The pulses are supplied thence to a vertical-deflection initiation stage 10 and a horizontal-deflection initiation stage 11. A vertical-deflection stage 14 and a horizontal-deflection stage 15, which feed a deflection component 16, are switched over to the output terminals 12 and 13 of integrated circuit 8. An audio intermediate-frequency signal is mixed from intermediate-frequency amplifier 3 and supplied to a low-frequency stage 18, which feeds a loudspeaker 19. A release signal is obtained in control circuit 20 from the coincidence of line-synchronization pulses from amplitude filter 9 with pulses obtained from horizontal deflection 11. The release signal makes only television transmitters audible through the output terminal 21 of integrated circuit 8. Only what happens with respect to the synchronization-pulse signals will be considered in what follows in relation to the additional circuits built into the television receiver for receiving videotext and teletext signals. Videotext decoder 22 and teletext decoder 23 are normally synchronized by the synchronization pulses of the composite color signal from intermediate-frequency stage 3. The switch 24 in the illustrated embodiment is set for videotext reception in what is called mixed operation, meaning that both a background consisting of video signals from the television signal in intermediate-frequency stage 3 and a foreground in the form of videotext signals are visible on screen 6. The synchronization signals from the composite color signal arrive at amplitude filter 9 through switch 25 and the contacts b-c of switch 5. In what is called after-hours operation, when, that is, the television transmitter has been turned off, the synchronous generators 26 and 27 built into decoders 22 and 23 must be switched over as indicated for example by the position of switch 28. The synchronous signal generated at that point then arrives at amplitude filter 9 through switch 28, switch 25, and the contacts b-c of switch 5. Since the television transmitter is off and synchronization is being carried out with synchronous generator 27, control circuit 20 will open the audio channel. The television-receiver tuner can be tuned to an outside broadcasting service and make it audible. This can only be discontinued by means of another audio-supression circuit, which is labeled 9' and 20'. This, however, means additional switching expense. The circuit illustrated in FIG. 2 is intended to avoid this expense while still ensuring reliable audio suppression when no television transmitter is being received. The components of the circuit that are the same as those illustrated in FIG. 1 are labeled with the same reference numbers. The difference from the device illustrated in FIG. 1 is that the synchronous generators in additional devices 22 and 23 consist of the deflectio generators 14 and 15 that are already in the television receiver anyway. Thus, even without the television signal, no audio will be audible any longer because the muting circuit is always in operation. The horizontal and vertical synchronization signals can be supplied to additional devices 22 and 23 in the form of a composite synchronization signal through a logical circuit 29. If logical circuit 29 is left out, the horizontal and vertical synchronization pulses can also be supplied separately to additional devices 22 and 23 as indicated by the vertical lines.

We claim:

1. A television receiver with a screen and receiving means for processing combined or individual videotext and teletext signals, comprising: decoder means with character generators in said receiving means for displaying characters on said screen; deflection generators for line-synchronized and frame-synchronized scanning of said character generators; said deflection generators being present in a usual television receiver for other operations; said character generators being synchronized only by said deflection generators, audio being forwarded only when an authorized television signal is received by said receiving means, said decoder means having memory means accessible for displaying a recognizable image during operating conditions even when a television transmitter transmitting to said receiving means is switched off so that a muting effect is completely maintained over other audio transmitters in the absence of synchronizing signals in signals transmitted by the television transmitter to said receiving means.

2. A method for processing combined or individual videotext and teletext signals in a television receiver with a screen and receiving means, comprising the steps of: displaying characters on said screen by decoder means with character generators in said receiving means; scanning said character generators by deflection generators present in a usual television receiver in line-synchronized and frame-synchronized scanning operation; and synchronizing said character generators only by said deflection generators, said deflection generators being present in a usual television receiver for other operations, audio being forwarded only when an authorized television signal is received by said receiving means, said decoder means having memory means accessible for displaying a recognizable image during operating conditions even when a television transmitter transmitting to said receiving means is switched off so that a muting effect is completely maintained over other audio transmitters in the absence of synchronizing signals in signals transmitted by the television transmitter to said receiving means.

* * * * *